United States Patent Office 3,437,293
Patented Apr. 8, 1969

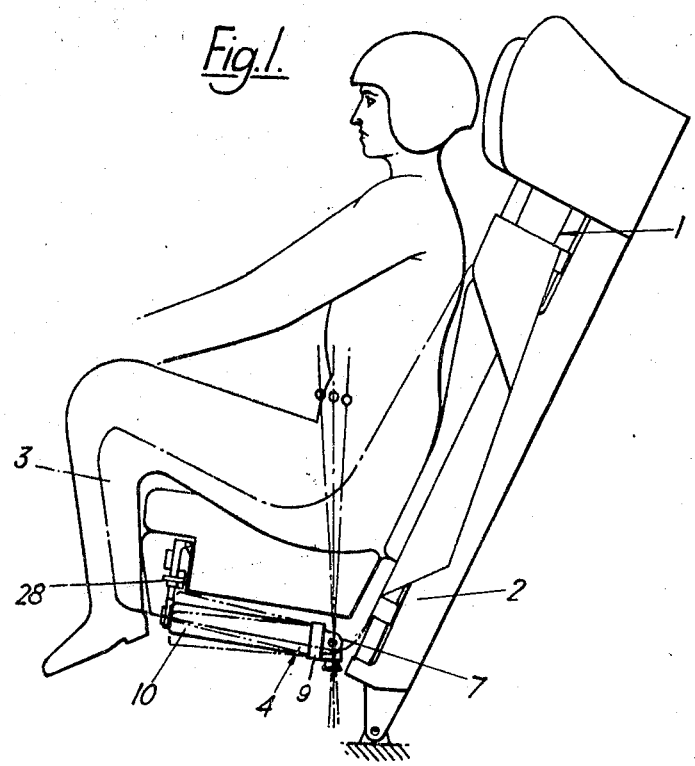
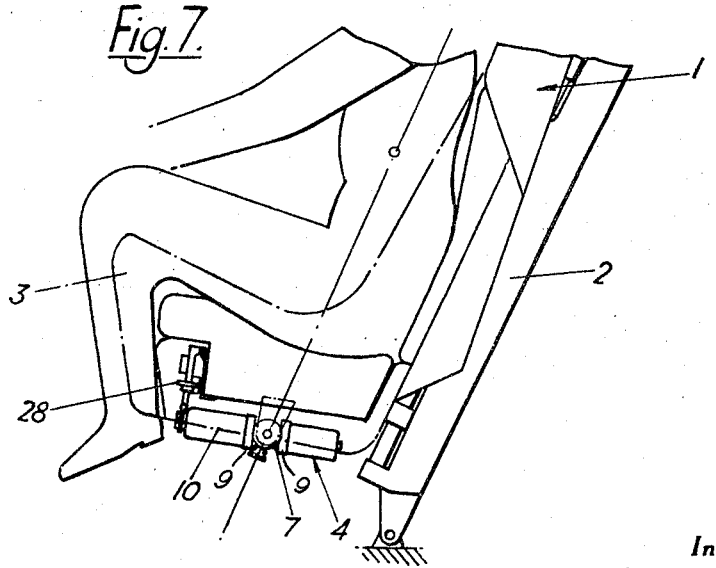
Inventor
JAMES MARTIN
By *Kurt Kelman*
AGENT

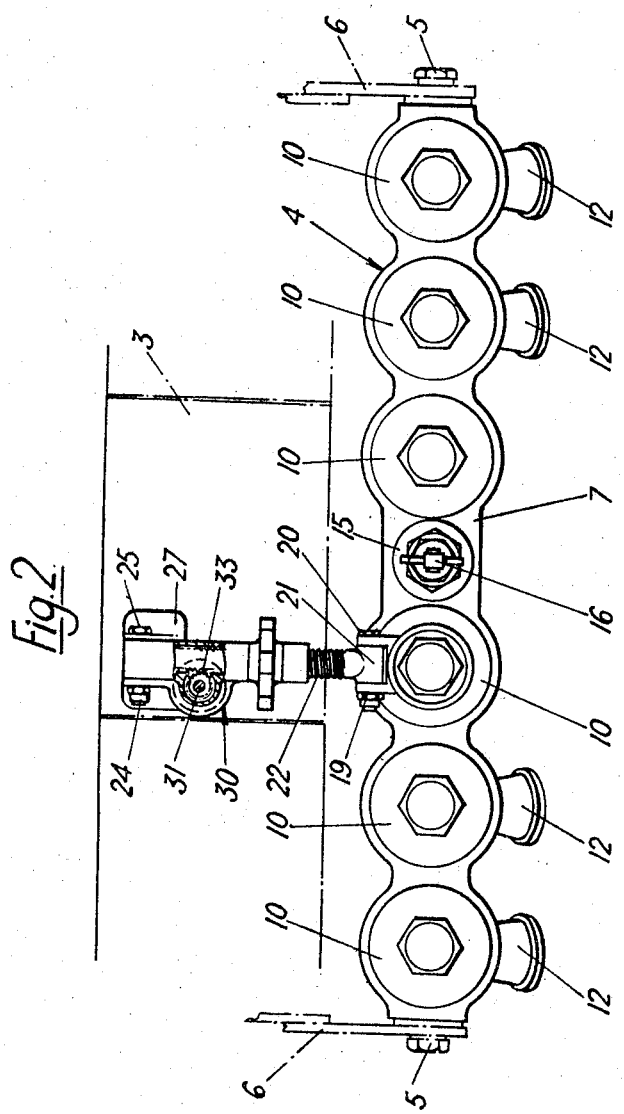

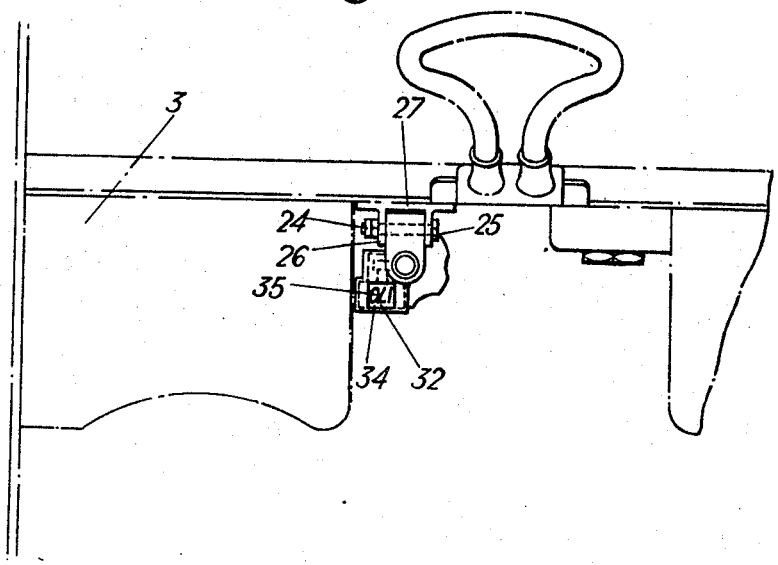
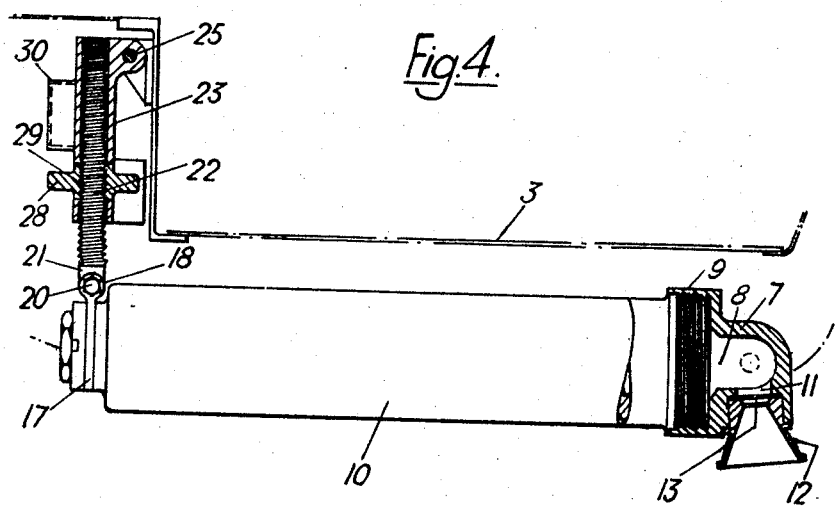

3,437,293
VEHICLE EJECTION SEATS
James Martin, Southlands Manor, Southlands Road, Denham, near Uxbridge, Middlesex, England
Filed Dec. 23, 1966, Ser. No. 604,354
Claims priority, application Great Britain, Nov. 25, 1966, 52,986/66
Int. Cl. B64d 11/06, 25/02; G09f 9/00
U.S. Cl. 244—122                           4 Claims

ABSTRACT OF THE DISCLOSURE

An ejection seat comprising a rocket motor pack pivotally secured beneath the seat and a linkage assembly between the seat and a position on the pack remote from the pivotal axis thereof, whose length may be varied to adjust and lock the pack in a plurality of angular positions with respect to the seat, the linkage assembly including an indicator significant of airman weight moments about a selected (arbitrary) datum. The indicator enables the length of the linkage assembly to be varied so that the rocket motor pack thrust line for any particular airman may be readily obtained.

---

This invention concerns vehicle ejection seats and, whilst this invention is particularly concerned with airman and aircraft ejection seats and will be described in relation thereto, the terms "aircraft ejection seat" and "airman" should be understood herein to embrace any vehicle ejection seat and its occupant where the context so admits.

In aircraft ejection seats successfully adopted in practice in the past, ejection of the seat from the aircraft has been effected by means of an ejection gun alone or by means of an ejection gun in conjunction with a rocket motor. Ejection seats utilising rocket motors in conjunction with ejection guns are the subject of, for example, U.S. Patents Nos. 3,186,662 and 3,124,324.

In each of the aforementioned patents it is stressed that it is important that the thrust line of the rocket motor should pass through, or substantially through, the centre of gravity of the seat/airman combination. Still further, in my British Patents Nos. 959,897 and 959,898, ejection seats are described in which provision is made for adjusting the position of the thrust line of the rocket motor.

One object of this invention is to provide an ejection system in which the present day requirements are more nearly met than hitherto, whilst another object is to provide an aircraft ejection system in which seat ejection is effected or assisted by an adjustable rocket motor which results in the trajectory of the ejected seat/airman combination being such as to enable safe ejection from an aircraft over a wide range of aircraft flight conditions including the zero-speed, zero-altitude case.

A further object of this invention is to provide an ejection seat with an easily adjusted compact rocket motor.

Thus, according to this invention there is provided an ejection system for ejecting an ejection seat/airman combination from an aircraft comprising an ejection gun for effecting initial ejection of the combination from the aircraft in a predetermined direction relative to the aircraft and at least one rocket motor pack positioned beneath the ejection seat, such rocket motor pack being pivotally mounted on said seat in such a manner as to permit angular movement thereof, adjusting means coupled to said rocket motor pack and to said ejection seat, such adjusting means being actuable to set the pack into a desired angular position significant of airman weight moments about a selected (arbitrary) datum. The adjusting means may comprise a linkage assembly extending between said seat and said pack and arranged so that the effective length of the assembly may be varied and the angular position of the pack may be locked in any one of a plurality of different angular positions with respect to the ejection seat. A portion of the linkage assembly is provided with markings constituting an indicator, such markings corresponding to an angular position of the pack with respect to the ejection seat. Such markings may be in the form of graduations significant of airman weight moments about a selected (arbitrary) datum, whereby the correct setting of the adjusting means to achieve appropriate positioning of the rocket motor pack thrust line for any particular airman using the seat may be readily obtained, given that particular airman's weight moment as computed or, alternatively, as measured by the use of a suitable test rig. One such suitable test rig is disclosed in my British Patent No. 959,900.

The adjusting means may comprise a transversely apertured link pivotally connected to the pack at one end and extending into a transversely apertured bracket on the ejection seat, a locking pin being provided for traversing said bracket and the link for locking the same in a desired position, such position being determined by introduction of the pin into the transverse aperture in the link appropriate to said weight moment of the airman to be seated in the seat. Very desirably, however, said adjusting means may comprise a linkage assembly including an externally screw-threaded shaft telescoping into a tubular member carrying for rotation about the longitudinal axis of such member an internally screw-threaded adjusting nut, the adjusting nut being threadedly engaged with said externally threaded shaft so that rotation of the nut in one direction causes the shaft to further enter the tubular member to shorten the effective overall length of the linkage, whilst rotation of the nut in the opposite direction causes the shaft and tubular member to move apart to increase such overall effective length of such linkage, the linkage being pivotally connected at its opposite ends to the seat and to the rocket motor pack. The tubular member carries an indicator with graduations significant of said airman weight moments, said indicator being operated in response to rotary movement of a sprocket which engages the screw thread of the said shaft so that during movement of the latter in a longitudinal direction with respect to the tubular member such externally threaded shaft constitutes a rack and such longitudinal movement thereof is transmitted directly to said sprocket and to the indicator.

Advantageously, said indicator may comprise a calibrated drum carried by a shaft rigid with said sprocket.

In order that the invention may be more readily understood, three embodiments of ejection seats will now be described by way of example and with reference to the accompanying drawings, in which:

FIGURE 1 is a side elevation of a preferred form of ejection seat in accordance with this invention;

FIGURE 2 is a fragmentary front elevation of the seat of FIGURE 1;

FIGURE 3 is a fragmentary plan view of the seat of FIGURES 1 and 2;

FIGURE 4 is a fragmentary side elevation, partly in section, of the seat of FIGURES 1 to 3;

FIGURE 7 is a side elevation of a third embodiment of ejection seat in accordance with this invention.

Figure 5:
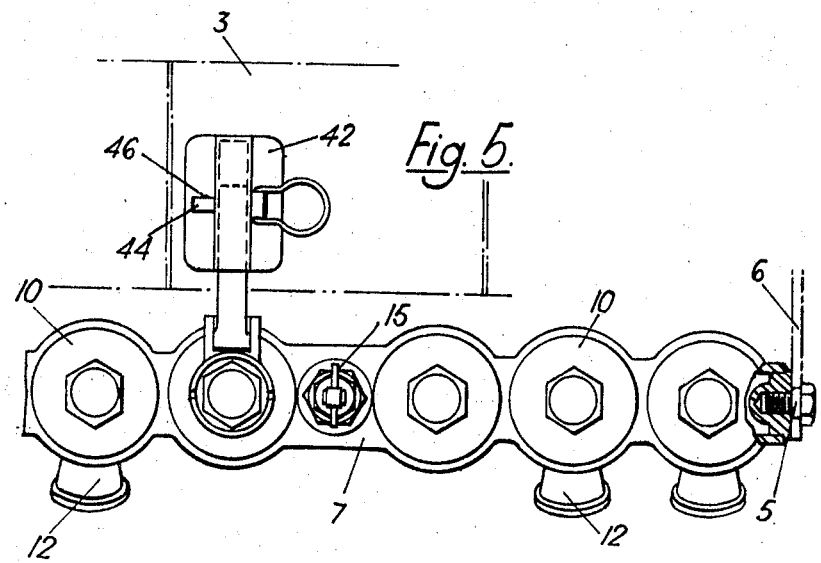
FIGURE 5 is a fragmentary front elevation of a second embodiment of ejection seat in accordance with this invention.

In a first embodiment, the ejection seat comprises a seat frame 1 equipped with an ejection gun 2 and a seat pan 3 beneath which there is a rocket motor pack 4 pivotally supported, towards the rear of the pan 3, by shouldered bolts 5 located in appropriate dependent brackets 6 on each side of the seat pan 3.

In this embodiment, the rocket motor pack 4 comprises a tubular spine 7 that is closed at its ends and which is adapted to be supported at these closed ends by the bolts 5 and brackets 6. The spine 7 has, at spaced intervals therealong, a series of ports 8 that communicate with annular bosses 9 welded, or otherwise suitably secured, to the spine 7. These bosses 9 are internally screw-threaded to receive complementary screw-threaded heads of canisters 10 containing charges of propellent, these charged canisters 10 each constituting a rocket motor for the pack 4. It will be appreciated that with this arrangement the total propellent charge weight may be selected to provide the pack 4 with a particular desired thrust capability and burning time and it will be apparent that the arrangement is adaptable to different installations by appropriate selection of canister sizes to be fitted to the spine 7. The charges in the canisters 10 are preferably extruded or similarly formed tubular bodies of solid charge material.

The spine 7 is also provided with a series of exhaust ports 11 and these ports have their axes directed downwardly and rearwardly from the axis of the spine 7 when the latter is so orientated as to be in a substantially horizontal attitude. The exhaust ports 11 communicate with nozzle stubs 12 which are normally closed by frangible diaphragms 13.

In this first embodiment, six canisters 10 are provided, all arranged in spaced parallelism. Extending from a central position along the spine 7, in the same general plane as the canisters 10, is a centrally-disposed breach tube 15 for firing the rocket motor pack and this tube 15 mounts a firing mechanism comprising a spring-biassed firing pin adapted to strike a ballistic initiating cartridge, such firing mechanism being generally designated 16.

Provided in an annular groove in the end portion of one of the canisters 10 adjacent said central breach tube 15 at its end remote from the spine 7 is a collar 17 terminating in a pair of apertured ears 18 adapted to receive a nut and bolt 19, 20, the bolt traversing said ears 18 and pivotally retaining between the ears a cylindrical boss 21 formed at one end of an externally screw-threaded shaft 22. This shaft 22 extends upwardly from the rocket motor pack 4 and with clearance enters into a tubular member 23 pivotally secured by a nut 24 and bolt 25 at its end remote from the pack 4 between a pair of bifurcations 26 extending forwardly from a bracket 27 rigidly secured against the front face of the seat pan 3. Positioned on, and coaxially with, the tubular member 23 is a knurled adjusting knob 28 provided with a central internally screw-threaded aperture 29, the screw thread around the aperture 29 engaging the screw thread of said shaft 22. The knob 28 is mounted to permit rotation thereof about the longitudinal axis of the tubular member 23 but is held fast against movement longitudinally of such member. Thus, rotation of the knob 28 will result in the externally threaded shaft 22 (which is prevented from rotation about its own axis by the bolt 20 passing through the cylindrical boss 21) moving longitudinally into, and out of, the tubular member 23.

At a position above the knob, the tubular member is provided with a bulbous housing, generally designated 30, which serves to mount, for rotation, a shaft 31 carrying at one end a drum 32 and at the other end a pinion 33, such pinion 33 being dimensioned so that its teeth engage the external screw thread of the shaft 22 which extends into the tubular member 23. With this arrangement it will be appreciated that axial movement of the shaft 22 in the direction of the longitudinal axis of the tubular member 23 will result in rotary movement of the pinion 33 (the screw thread of the shaft acting as a rack) and resultant movement of the drum 32. The housing 30 in the vicinity of the drum 32 is provided with a transparent window 34 through which markings 35 on such drum 32 may be seen.

It will be appreciated that the angular position of the pack 4 and, in consequence, the direction of the thrust line of the pack 4 may simply be varied by rotating the knurled knob 28, one direction of rotation extending the overall effective length of the linkage and depressing the front end of the pack 4 so that the thrust line of the pack is canted forwardly whereas rotation of the knob 28 in the opposite direction has the opposite effect.

Such angular movement of the pack 4 is accurately transmitted through the rack and pinion arrangement to the drum 32 and appropriate calibration of this drum with markings will enable the thrust line of the pack to be set in any one of a number of particular directions to suit different airmen of different builds which, when seated in the ejection seat, result in the centre of gravity of the seat/airman combination being altered.

The preferred form of markings 35 used on the drum 32 for indicating settings of the rocket motor pack 4 are values of airman weight moments about a selected (arbitrary) datum, the marked values being, of course, such that the value presented for any particular setting corresponds with the value of airman weight moment for which the setting concerned is correct. The airman weight moment values may be computed, for any airman, from the value of the airman's weight and data determining his centre of gravity with respect to a selected datum.

Such moments are, however, easily determined by direct measurement with a suitable test rig, for instance the test seat disclosed in my British Patent No. 959,900.

Figure 6:
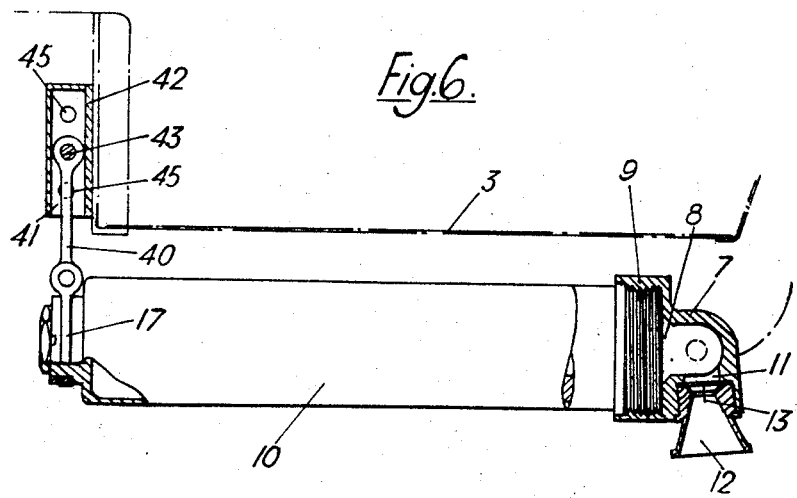
FIGURE 6 is a fragmentary side elevation, partly in section, of the seat of FIGURE 5.

In the second embodiment of ejection seat shown in FIGURES 5 and 6, a different structure for adjusting the angular position of the rocket motor 4 is utilised. In this second embodiment, the externally screw-threaded shaft 22 is replaced by a first link member constituted by plain link or shaft 40 pivotally coupled to the rocket motor pack 4 at one end portion (through the intermediary of a collar 17), the other end portion extending into a second link member constituted by a tubular portion 41 of a bracket 42 secured adjacent the front face of the ejection seat pan 3. The shaft 40 has a transverse aperture 43 in its end portion which lies within said tubular portion 41, this aperture being adapted to receive a locking element or peg 44 which may be threaded therethrough and through any selected pair of a series of pairs of apertures 45 provided at spaced intervals along said tubular portion 41.

This arrangement enables the rocket motor pack 4 to be set into any one of a number of predetermined angular positions in dependence upon which pair of holes 45 is selected to receive said peg 44. Each pair of holes would be significant of a particular airman weight moment about a selected (arbitrary) datum and such apertures are conveniently designated appropriately. Any suitable locking peg 44 may be utilised but desirably means, for example a spring-biassed pip 46, may be provided to prevent accidental withdrawal of the peg.

In both the above described arrangements, a rocket motor pack 4 has been described which has a spine 7 with discharge nozzles towards the rear of the seat and the thrust line of the pack 4 is directed, therefore, substantially vertically upwards (as indicated by the arrows in FIGURE 1) through the centre of gravity of the seat/airman combination.

It should be appreciated, however, that a pack 4 with a central spine 7 carrying the discharge nozzles could be provided and, in such an arrangement, the thrust line could be orientated to pass substantially through the centre of gravity in a generally upward direction and also in a direction substantially parallel to the thrust line of the ejection gun. An ejection seat with such a centrally spined pack is shown in FIGURE 7.

I claim:
1. In an ejection seat for ejecting a seat/airman combination from an aircraft comprising: an ejection gun for effecting initial ejection of the combination from the aircraft in a predetermined direction relative to the aircraft; at least one rocket motor pack positioned beneath the ejection seat; means for pivotally securing said pack to said ejection seat to permit angular movement thereof with respect to the seat; and adjusting means being actuatable to set the pack into a desired angular position significant of airman weight moments about a selected (arbitrary) datum, said adjusting means being constituted by a linkage assembly which extends between said seat and a position on the pack displaced from the pivotal axis thereof, means being provided whereby the effective length of said linkage assembly may be varied and the angular position of the pack may be locked in any one of a plurality of different angular positions with respect to the ejection seat, the improvement of the linkage assembly being provided with markings constituting an indicator, such markings corresponding to an angular position of the pack with respect to the ejection seat and such markings being in the form of graduations significant of airman weight moments about a selected (arbitrary) datum, whereby the correct setting of the adjusting means to achieve appropriate positioning of the rocket motor pack thrust line for any particular airman using the seat may be readily obtained, given that particular airman's weight moment as computed or, alternatively, as measured by the use of a suitable test rig.

2. In an ejection seat for ejecting a seat/airman combination from an aircraft comprising: an ejection gun for effecting initial ejection of the combination from the aircraft in a predetermined direction relative to the aircraft; at least one rocket motor pack positioned beneath the ejection seat; means for pivotally securing said pack to said ejection seat to permit angular movement thereof with respect to the seat; and adjusting means formed by a linkage actuable to set the pack into a desired angular position significant of airman weight moments about a selected (arbitrary) datum, such linkage comprising an externally screw-threaded shaft; a tubular member for receiving said externally screw-threaded shaft; an adjusting nut threadedly engaged on said shaft and restrained against longitudinal movement with respect to the tubular member in the direction of the length of the shaft, the arrangement being such that rotation of the nut in one direction causes the shaft further to enter the tubular member to shorten the effective length of the linkage, while rotation of the nut in the opposite direction causes the effective length of the linkage to be increased by causing the shaft and the tubular member to move in a direction away from one another, opposite ends of the linkage being pivotally connected respectively to the seat and to the pack, the improvement of an indicator forming part of said adjusting means and this indicator being provided on said tubular member; graduations being provided on said indicator which are significant of said airman weight moments; a sprocket being provided for engagement with the screw thread of said shaft; means being provided to transmit rotary movement of the sprocket to said indicator; and the arrangement being such that longitudinal movement of the shaft with respect to the tubular member as a result of rotation of the adjusting nut will be transmitted to the indicator.

3. An ejection seat according to claim 2, wherein said indicator comprises a calibrated drum carried by a shaft rigid with said sprocket.

4. In an ejection seat for ejecting a seat/airman combination from an aircraft comprising: an ejection gun for effecting initial ejection of the combination from the aircraft in a predetermined direction relative to the aircraft; at least one rocket motor pack positioned beneath the ejection seat; means for pivotally securing said pack to said ejection seat to permit angular movement thereof with respect to the seat; and adjusting means being actuable to set the pack into a desired angular position significant of airman weight moments about a selected (arbitrary) datum, said adjusting means being constituted by a linkage assembly which extends between said seat and a position on the pack displaced from the pivotal axis thereof, means being provided whereby the effective length of said linkage assembly may be varied and the angular position of the pack may be locked in any one of a plurality of different angular positions with respect to the ejection seat, the improvement of the linkage assembly including two link members, one of said link members having one transverse aperture and the other link member having a series of transverse apertures, and a locking element passing through said one aperture and a selected one of the series of apertures for adjustably interconnecting the link members, the relative positioning of the one aperture with respect to the selected aperture being so arranged as to be significant of an airman's weight moment about a selected (arbitrary) datum whereby the selection of the selected aperture to achieve appropriate positioning of the rocket motor pack thrust line for any particular airman using the seat may be readily obtained, given that particular airman's weight moment as computed or, alternatively, as measured by the use of a suitable test rig.

References Cited

UNITED STATES PATENTS 3,124,324 3/1964 Martin.
3,126,173 3/1964 Alvarez-Calderon.
3,190,589 6/1965 Mennborg.

MILTON BUCHLER, *Primary Examiner.*

RICHARD A. DORNON, *Assistant Examiner.*

U.S. Cl. X.R.

116—124